Jan. 27, 1970     W. E. KELLY     3,492,410

JACKETED METALLIC CONDUIT CONNECTOR

Filed July 26, 1967

INVENTOR
WILLIAM E. KELLY
BY David Teschner
ATTORNEY 3,492,410
JACKETED METALLIC CONDUIT CONNECTOR
William E. Kelly, Bradley Beach, N.J., assignor to Thomas
& Betts Corporation, a corporation of New Jersey
Filed July 26, 1967, Ser. No. 656,212
Int. Cl. H02g 15/02, 15/08, 3/18
U.S. Cl. 174—78                         5 Claims

ABSTRACT OF THE DISCLOSURE

The invention comprises a grounding ring for use in a Jacketed Flexible Metallic Conduit Connector which consists of an outer sleeve for contacting the body of such a connector to establish a ground connection between the grounding ring and the body of the connector and an inner sleeve coupled thereto. Said inner sleeve extending beyond the outer sleeve and terminating in a rib outwardly extending from the inner sleeve formed in a generally helical pattern comprising substantially a single turn. The outwardly extending rib is adapted to engage the voids between the convolutions of the inner metallic conduit surface. The grounding ring is coupled to the metallic conduit by engaging the outwardly extending rib in conduit convolution voids. The rib will seat itself by expanding the voids between such convolutions so as to insure firstly, that the grounding ring is securely held to such flexible metallic conduit and secondly, to provide grounding between the metallic conduit and the grounding ring by means of the rib or the outer surface of the inner sleeve or a combination of both. Both the leading and trailing edges of the rib are tapered to facilitate entry and exit of the ring and a portion of the inner sleeve extends therebetween to add rigidity to the rib and assure proper alignment.

BACKGROUND OF THE INVENTION

Field of the invention

The invention is directed to the field of terminations and connectors for jacketed flexible metallic conduit. Flexible metallic conduit is constructed of two distinct layers; the first being a metallic flexible tubing constructed of a plurality of convolutions of metal. Due to the manner in which this tubing is constructed there result recesses or voids between the respective turns or convolutions of the tubing, both on the inner and outer surfaces. Placed on top of the flexible metallic tubing is a jacket of insulating material. Conductors may then be passed through the hollow inner metallic tubing and are protected by the flexible metallic tubing and the insulation thereabout. It is essential in connecting flexible metallic conduit or terminating same to service boxes or the like that the flexible metallic conduit itself be grounded to the box and that the conduit be properly supported to prevent the insulating jacket from being drawn away from the interior flexible tubing and that the entire assembly be securely held to prevent the destruction of the conduit and possible destruction of the conductors within such conduit.

Description of the prior art

As is shown in FIGS. 1, 2 and 3, which depict a typical prior art device, the gland nut is placed over the jacket of the flexible metallic conduit. Also placed over the jacket and within the gland nut is the sealing ring. Then screwed into the voids between the convolutions of the flexible metallic tubing of the conduit is a grounding cone or ring and finally the assembly is held together by a connector body which is joined to the gland nut. The entire assembly is held by the forces exerted by the gland nut upon the sealing ring, which forces itself within the ground cone and causes the outer sleeve of the grounding ring to firmly engage the connector providing a good ground contact. The connector itself may be screwed at its far end to a further service cable or other connectors as required.

As shown in FIG. 3, the usual type of grounding ring or cone consists of at least two or more turns of screw thread placed upon the inner grounding sleeve. As a result of this multiplicity of turns, it is necessary that the pitch of the screw threads be matched to the voids between the convolutions of the inner surface of the metallic flexible tubing of the conduit. Further, based upon the width of each one of the screw threads, the voids will be forced to compress or expand to permit proper receipt of the screw threads within the voids between the convolutions. It has been found in practice, that unless the width and pitch of the screw threads exactly match the voids between the convolutions of the inner surface of the flexible metallic tubing, complete seating of the grounding ring does not occur. Further, the height of the screw threads are such that unless the inside diameter of the flexible metallic tubing matches the outside diameter of the screw threads, complete contact is not achieved between the screw threads of the inner grounding sleeve and the inside surface of the flexible metallic tubing of the conduit to assure proper grounding. Thus, minimal electrical contact is generally provided in conduits with which such prior art grounding rings are employed. Such minimal contact between the grounding ring screw threads and the voids between the convolutions of the inner surface of the flexible metallic tubing not only decreases the amount of grounding surface contact which is achieved, but further results in minimal mechanical anchoring of the grounding ring with respect to the flexible metallic conduit. Additionally the trailing edge of the inner sleeve is straight which fails to provide wear protection for the conductors passed through the conduit.

SUMMARY OF THE INVENTION

The present invention obviates the difficulties noted above with respect to grounding rings or cones of prior art devices, by providing a single turn screw thread grounding ring employing an outwardly extending rib built upon the exposed end of the inner grounding sleeve. Due to its shape, pitch, thickness and height, this rib is able to grasp the voids between the convolutions of the flexible metallic tubing of the conduit and to reach far enough into such voids to establish proper holding power and establish a grounding contact for the grounding ring. Additionally, the rib also permits the grounding ring to operate with a wide range of convolute pitch types and a wide range of tolerances that exist between flexible conduit of different manufacturers than is possible with prior art devices. Further, the extent and form of the rib results in a ground connection between the conduit and such ribs as well as between the conduit and the inner sleeve itself. Additionally, the thin rib is permitted to enter merely a single convolution void and thus it is only necessary to expand but a single void in order to accept the single rib, thus assuring complete seating of the grounding ring within the flexible metallic tubing. The leading and trailing edges of the rib are tapered to facilitate the entry and exit of the grounding ring rib into and out from the convolution voids and prevent the destructive engagement possible with square ended ribs. Further, a portion of the inner grounding sleeve extends between the ends of the rib providing rigidity to the rib structure and assuring the desired alignment between the rib ends.

It is therefore an object of this invention to provide an improved form of grounding ring for use with a flexible metallic conduit connector.

It is another object of this invention to provide an improved grounding ring for use with a flexible metallic conduit connector, which is simple to manufacture and low in cost.

It is yet another object of this invention to provide an improved form of grounding ring for use with a flexible metallic conduit connector which forms a strong mechanical bond with such conduit and which provides complete grounding for the flexible metallic tubing of such conduit.

It is still another object of this invention to provide new form of grounding ring for use with a flexible conduit connector capable of operating with flexible metallic conduit over a wide range of conduit inner diameter and conduit construction.

Other objects and features of the invention will be pointed out in the following description and claims and illustrated in the accompanying drawing, which disclose, by way of example, the principle of the invention, and the best mode which has been contemplated for carrying it out.

BRIEF DESCRIPTION OF THE DRAWINGS

Similar elements are given similar reference characters of each of the respective drawing.

Turning now to FIG. 1 there is shown in exploded form a connector for jacketed flexible metallic conduit constructed in accordance with prior art teachings. Further, there is shown a portion of a flexible metallic conduit, sectioned to expose the inner construction thereof. The flexible metallic conduit 10 has an outer insulating jacket 12, and an inner flexible metallic tubing 14. This flexible metallic tubing 14 is formed by winding a series of convolutions 16 of a desired metal. Between the various convolutions 16 are a series of voids 18. These voids 18 do not extend all the way through the flexible metallic tubing 14, but appear rather as complementary voids on both the inner and outer surfaces of flexible metallic tubing 14.

Figure 1:
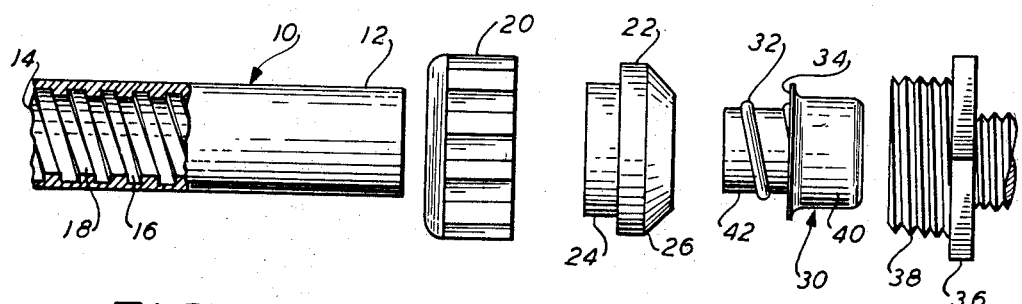
FIG. 1 is an exploded view of a prior art flexible metallic conduit connector and showing a portion of the conduit.

To assemble the connector, a gland nut 20 having a central opening extending therethrough and having a portion thereof with internal screw threads (not visible in the figure) is slipped over the jacket 12 of the flexible metallic conduit 10. Next a sealing ring 22 is placed within the gland nut 20 and over the jacket 12 of the flexible metallic conduit 10. The sealing ring 22 has a shoulder 24 adapted to pass through the central opening of the gland nut 20 and provide an insulated protective collar for the gland nut 20. In this manner rough edges of the central opening of the gland nut 20 are not permitted to injure the jacket 12 of the jacketed flexible metallic conduit 10. The sealing ring 22, in addition, has a tapered shoulder 26. When the entire connector is assembled, the shoulder 26 of sealing ring 22 will engage with the inner surface of the outer sleeve of the grounding ring to be described below, to provide a liquid tight seal preventing the entrance of moisture into the connector itself. After the gland nut 20 and the sealing ring 22 have been placed on the jacket 12 a grounding ring or cone 30 is then screwed by means of its screw threads 32 into the voids 18 between the convolutions 16 of the flexible metallic tubing 14 of the jacketed flexible metallic conduit 10. The lip 34 of the grounding ring 30 is brought into contact with the shoulder 26 of the sealing ring 22. Finally the connector body portion 36 is placed atop the grounding ring 30 and coupling effected between the external screw thread 38 of the connector body 36 and the internal screw thread of the gland nut 20. This tightening action causes the shoulder 26 of the sealing ring 22 to engage the lip 34 of the grounding ring 30 causing a water tight seal and forcing the outer sleeve 40 of the grounding ring to contact the inner surface of the connector body 36. In addition the flexible conduit 10 is then trapped between the inner sleeve 42 of the grounding ring and the outer sleeve 40 of the grounding ring 30. This provides a mechanical connection and coupling between the conduit 10 and the connector assembly.

Figure 2:
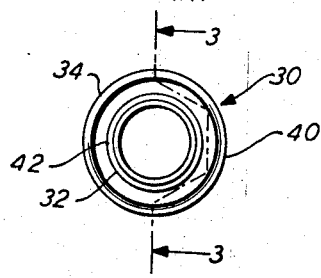
FIG. 2 is a rear view of a grounding ring or cone of the connector shown in FIG. 1.
Figure 3:
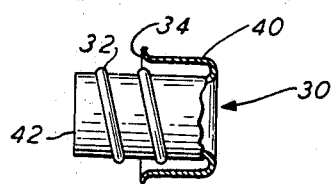
FIG. 3 is a sectioned side elevation of the grounding ring of FIG. 2, taken along the line 3—3.

Turning now to FIGS. 2 and 3, the details of a grounding ring 30 of the prior art may be better understood. As viewed from the rear in FIG. 2, the grounding ring appears as two concentric sleeves 40 and 42 joined at their leading edges and exposed at their trailing edges. Viewing FIG. 3, which is a sectional view of grounding ring 30 as shown in FIG. 2 and taken along the line 3—3, the external details of the screw arrangement may be better understood. As can be seen, there are two turns of screw thread 32 placed about the inner sleeve 42 of the grounding ring 30. Due to the height of these screw threads, their width, pitch and spacing, it is necessary that the voids 18 between the convolutions 16 of the flexible metallic tubing 14 match the height, width, pitch and spacing of the screw threads 32 of the grounding ring 30 for maximum holding strength and maximum grounding contact. Further, it is necessary that there be a proper expansion and contraction of the voids 18 and the convolutions 16 in order to accept both screw threads 32, that is, the convolution 16 ahead of the leading screw thread 32 must expand while between the screw threads 32 there will be compression of the convolutions 16. This will place an uneven stress on the conduit which may weaken its holding power. Further, in addition to the incomplete holding, poor grounding contact will be achieved.

Figure 4:
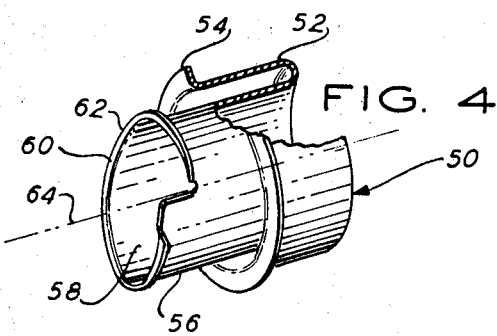
FIG. 4 is a perspective view, partially in section, showing a grounding ring or cone constructed in accordance with the concepts of this invention.

Turning now to FIG. 4, there is shown a grounding ring 50 constructed in accordance with concepts of this invention. The grounding ring 50 is constructed of an outer grounding sleeve 52 having an outwardly projecting lip 54. Within the outer grounding sleeve 52 is placed an inner grounding sleeve 56. Inner sleeve 56 and outer sleeve 52 are coupled in a smooth leading edge similar to that shown for the grounding ring 30 of FIG. 3. This smooth leading edge leading into the opening 58 within the inner grounding sleeve 56 insures that conductors passing through the opening 58 from within the jacketed flexible metallic conduit will not be interfered with nor will its insulation be degraded by rough edges on the connector body itself. The trailing edge 60 of the inner grounding sleeve 56 terminates in a built up rib 62 which may be formed as an integral portion of the trailing edge 60 of the inner grounding sleeve 56 or which may be added to it by welding or otherwise attaching a rib 62 to such edge 60. The general shape of the edge 60 and the rib 62 is that of a single thread of a helix beginning at the center line 64 and ending a given pitch distance away, also, along the center line 64. The leading and trailing ends of the rib 62 are tapered to facilitate the screwing in of the rib 62 of the grounding ring 50 into the voids 18 between the convolutions 16 of the flexible metallic tubing 14. Any sharp edges to a rib could cause the binding of the rib with attendant mis-seating of the grounding ring or destruction of the tubing. In a similar manner the trailing edge taper of rib 62 permits its easy removal without the possibility of destruction to tubing 14. The portion of inner grounding sleeve 56 extending between the leading and trailing edges of rib 62 assures the rigidity of the rib and assures the alignment of the rib 62 ends so that the desired pitch and spacing can be maintained. This is not possible in rings of the split type or those having unsupported thread or rib ends.

The rib 62 will be of sufficient height to enter the voids 18 between convolutions 16 of the jacketed flexible metallic conductor 10 as shown in FIG. 1. The rib 62 will be of sufficient height to permit a tight locking contact with the top of such voids 18 as well as provide a positive shoulder to hold the adjacent convolution 16. Further, due to the height of the rib 62, a wider variety of inside diameters of flexible metallic tubing 14 may be accommodated. The single turn rib 62 insures that only a single void 18 between convolutions 16 will be entered. Thus, the stress conditions noted above with respect to prior art grounding ring 30 of FIG. 3 do not exist and the holding power of grounding ring 50 is increased. In addition, grounding contact will be achieved by means of rib 62, as well as the outer surface of the inner grounding sleeve 56. Although grounding sleeve 50 in FIG. 4 has been shown fabricated from the single unitary member, it should be understood that this device may be constructed from two or three portions. For example: it is possible to fabricate the inner grounding sleeve 56 of a single piece and add to it an outer grounding sleeve 52 and a rib 62. Alternatively, it is possible to make sleeves 52 and 56 unitary and add the grounding rib 62 as a separate assembly. Any of these noted constructions are considered to fall within the teaching of this invention. The coupling between rib 62 and the inner grounding sleeve 56 is smooth to provide a safe-lip to prevent abrasion or degradation of the insulation of conductors passed through the conduit 10.

Figure 5:
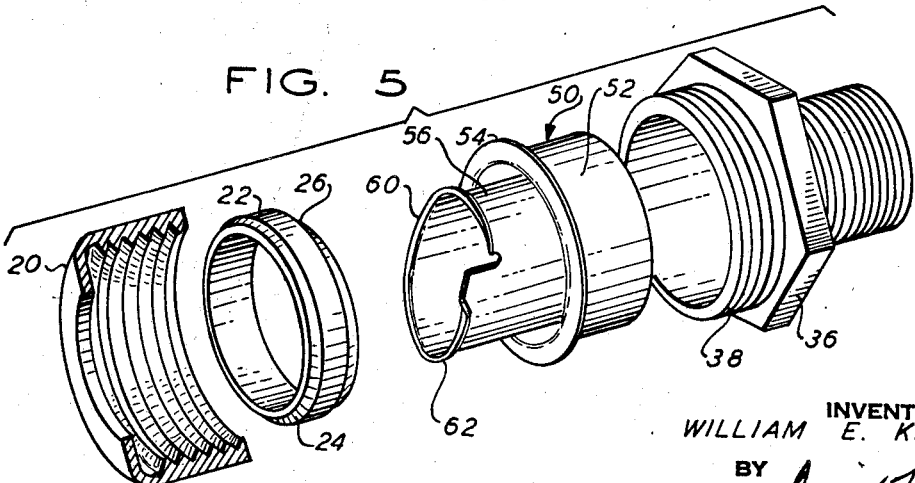
FIG. 5 is a perspective view, partially sectioned, of a flexible metallic conduit connector incorporating the novel grounding ring or cone constructed in accordance with the concepts of this invention.

Turning now to FIG. 5, the assembly of the grounding ring 50 into the overall connector is shown. Again the gland nut 20 will be placed over the jacket 12 of the flexible metallic conduit 10. Then the sealing ring 22 will be placed within the opening within the gland nut 20 providing a protective edge 24 to prevent damage to the jacket 12 of the flexible metallic conduit 10. The ground ring 50 will then be screwed into the convolution voids 18 between the convolutions 16 of the flexible metallic tubing 14 of the conduit 10. The rib 62 of the trailing edge 60 at the grounding ring 56 will be made to engage a void 18 and a convolution 16. Jacket portion 12 as well as the flexible metallic tubing 14 will then be captured in the space between the inner grounding sleeve 56 and the outer grounding sleeve 52. The body of the connector 36 will then be placed over the exposed outer grounding sleeve 52 and screw threads 38 will be joined with the internal screw threading of the gland nut 20 to cause compression and assembly of the entire connector. As previously explained, the tapered leading edge 26 of the sealing ring 22 will force against the rib 54 of the outer grounding sleeve 52 and will cause a tight grounding connection to be achieved between the outer surface of the outer grounding sleeve 52 and inner surface of the connector body 36. In addition, the effect of this will cause the flexible metallic tubing 14 to be grasped between the inner grounding sleeve 56 and the outer grounding sleeve 52, thus making a mechanical assembly of the connector and the conduit. Further, as it is shown in FIG. 5, the leading and trailing edges of the rib 62 are smoothly tapered towards the surface of the inner grounding sleeve 56 thus making the assembly and dissassembly of the grounding ring 50 simple.

The embodiments of the invention in which an exclusive property or privileges claimed are defined as follows:

1. A grounding ring for grounding a flexible metallic conduit, said conduit being formed of a plurality of helical turns of metal of a predetermined pitch with each turn separated by voids of similar pitch, said grounding ring comprising: an outer grounding sleeve, having first and second edges; said outer grounding sleeve adapted to engage the body of a conduit connector; an inner grounding sleeve concentric with and spaced apart from said outer grounding sleeve; said inner grounding sleeve having a first edge coextensive with and coupled to said first edge of said outer grounding sleeve and a second edge extending beyond said second edge of said outer grounding sleeve; and a helical rib extending outwardly along said second edge of said inner grounding sleeve; said rib having a pitch different than that of the predetermined pitch of said conduit; the ends of said rib being tapered to smoothly pass along the voids of said conduit; a portion of said inner grounding sleeve extending between the ends of said rib to support and hold in alignment said rib ends; said rib adapted to engage said voids and helical turns of metal of said conduit whereby said conduit may be grounded.

2. A grounding ring, as defined in claim 1, wherein said rib is formed integrally with said second edge of said inner grounding sleeve whereby said rib and said second edge of said inner grounding sleeve form a protective edge to prevent abrasion of the insulation of conductors placed in said conduit.

3. A grounding ring, as defined in claim 2, wherein said second edge of said outer grounding sleeve is flared outwardly to provide a shoulder to limit the entry of said grounding ring and seat said grounding ring when assembled to the body of a conduit connector.

4. A grounding ring, as defined in claim 1, wherein said rib comprises substantially a single turn of said helix.

5. A grounding ring, as defined in claim 1, wherein the coupling between said first edges of said inner and outer grounding sleeves is continuous and smooth whereby abrasion of the insulation of conductors passed through said inner grounding sleeve is prevented.

References Cited

UNITED STATES PATENTS

| | | | |
|---|---|---|---|
| 1,808,542 | 6/1931 | Ginsburg | 174—83 |
| 1,842,216 | 1/1932 | Thomas | 174—83 X |
| 2,821,567 | 1/1958 | Bergan. | |
| 3,006,664 | 10/1961 | Appleton et al. | 285—248 |
| 3,393,267 | 7/1968 | Busse | 174—78 |

LARAMIE E. ASKIN, Primary Examiner

U.S. Cl. X.R.

174—65, 83; 285—248